Dec. 12, 1967  J. J. DYKI  3,357,678
MECHANISM FOR MOUNTING A LIQUID VALVE
Filed July 26, 1965
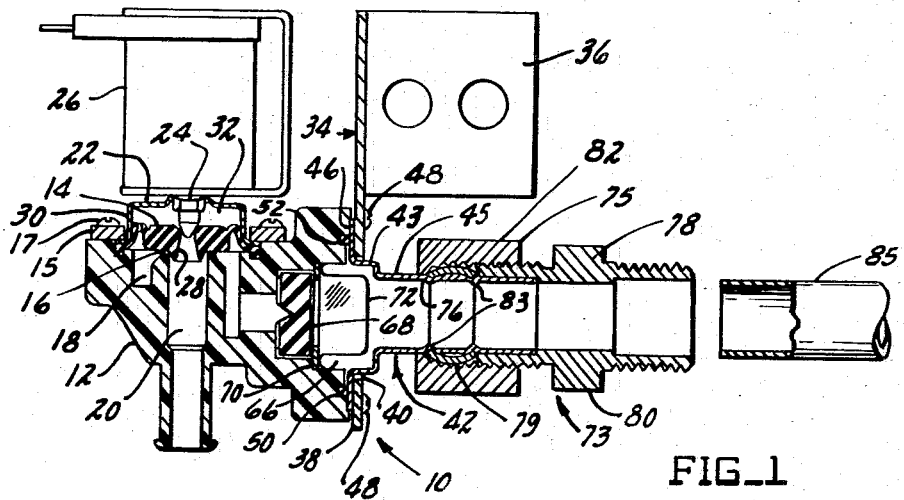
FIG_1
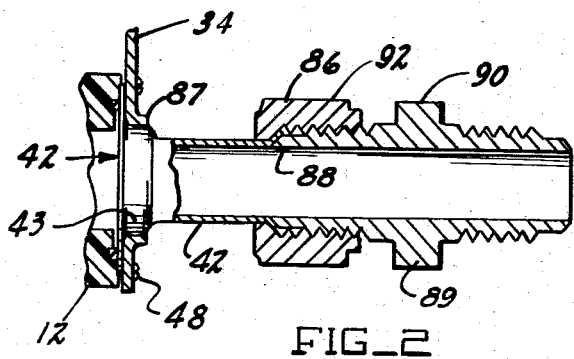
FIG_2
INVENTOR.
JOSEPH J. DYKI
BY
TENNES I. ERSTAD
JOHN E. McRAE
ATTORNEYS ยง 3,357,678
MECHANISM FOR MOUNTING A LIQUID VALVE
Joseph James Dyki, Inkster, Mich., assignor to American Radiator & Standard Sanitary Corporation, New York, N.Y., a corporation of Delaware
Filed July 26, 1965, Ser. No. 474,602
1 Claim. (Cl. 251—148)

This invention relates to liquid valves, and particularly to valves formed partly of plastic, such as nylon, and partly of metal, such as brass. The invention in certain aspects may be considered an improvement on the invention disclosed in U.S. Patent 2,922,616, issued to J. C. Budde.

One object of the present invention is to provide a plastic-metal valve wherein novel metal components are used to mount the valve and to connect the valve with supply tubing without permitting the tubing to engage the plastic component or otherwise transmit a damaging torque thereto as the valve is being connected to the tubing.

Another object is to provide an improved plastic-metal valve wherein the plastic component is provided with a pocket to accommodate a resilient flow control member and strainer in axial alignment with a low cost metal inlet coupling member which is carried by a metal mounting bracket, whereby to permit ready access to the flow control member and strainer without disconnection of the coupling member from the mounting bracket or the supply line.

A further object is to provide a plastic-metal valve which has desired features of low cost, long service life, and easy access to its internal parts.

Other objects of this invention will appear from the following description, accompanying drawings, and appended claim.

In the drawings:

FIGURE 1 is a sectional view taken through a valve incorporating features of the invention therein;

FIG. 2 is a fragmentary sectional view through a second valve incorporating features of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a liquid valve 10 generally similar to the valve shown in co-pending U.S. patent application, Ser. No. 390,899, filed Aug. 20, 1964. The present valve comprises a molded plastic valve body 12 which mounts a conventional rubber diaphragm 14. Underlying diaphragm 14 is an annular valve seat 16 which subdivides body 12 into an annular entrance passage 18 and a central exit passage 20. Overlying diaphragm 14 is a metal cover 22 which houses the plunger-type armature 24 of a conventional solenoid 26. Securement of cover 22 on valve body 12 may be effected by an annular bracket 15 and four screws 17.

Energization of the solenoid raises armature 24 whereby to open the central opening 28 in diaphragm 14 and allow the pressure in passage 18 to raise the diaphragm for permitting the flow of liquid into passage 20. De-energization of the solenoid permits armature 24 to close opening 28, thereby allowing the liquid which has flowed through bleed opening 30 to be trapped in space 32 for thus exerting a downward force on diaphragm 14 to close same against seat 16.

To operatively mount the valve on a suitable support structure, such as the frame of a domestic dishwasher, there may be provided a metal mounting bracket 34 which includes a first apertured plate portion 36 adapted to engage the dishwasher frame, and a second plate portion 38. If desired the plate portion 36 could be formed as part of bracket 15 instead of bracket 34; in that case the valve would be mounted by means of bracket 15. This ability to mount the valve through bracket 15 is a feature not enjoyed by certain plastic-metal valves having other features of the present design. In the illustrated arrangement an enlarged hole 40 in bracket 34 accommodates a thin-walled tubular metal coupling member 42 having a large diameter portion 43 and a small diameter portion 45. Hole 40 is preferably circular in outline, although it could take other shapes; for example the hole could be in the nature of an elongated slot extending to the lower edge of plate portion 38. Coupling member 42 is provided with a radial flange 46 which is sandwiched between plate portion 38 and the flat face of valve body 12. To draw the valve body against flange 46 I employ four headed screws 48 which extend through bracket 34 into the valve body. An annular rubber gasket 50 is disposed in a valve body groove 52 to seal the joint between member 12 and flange 46.

It will be noted that valve body 12 is provided with a pocket 66 which accommodates a resilient flow control member 68, a retainer 70, and a hat-like strainer screen 72. Member 68 is preferably a resilient disc having grooves in its downstream face as more particularly shown in co-pending U.S. patent application Ser. No. 231,414 filed Oct. 18, 1962, now Patent 3,194,272, issued July 13, 1965; it functions to pass a substantially constant flow of liquid into passage 18 in spite of substantially variations in supply pressure. Access to the flow control member and screen 72 may be had by loosening screws 48 to separate the valve body from coupling member 42; it is not necessary to remove bracket 34 from its position on the dishwasher or other mounted location.

To connect the FIG. 1 valve to the supply tubing there may be provided a conventional compression fitting 73 comprised of a first internally threaded nut member 75 having an inwardly directed shoulder 76 adapted to closely encircle an outer surface of the tubular coupling member 42. A second externally threaded member 78 is adapted to be threaded into member 75 to apply an axial force on an interposed sleeve 79 which is illustrated as having a pre-formed half moon longitudinal cross section. Other sleeve cross sections such as triangular may be employed.

Tubular portion 45 of the thin-walled coupling member is initially smooth-surfaced and devoid of depressions. However, after members 75, 78 and 79 have been slipped over the tubular portion, opposing torques can be applied to wrench flats 80 and 82 to cause members 75 and 78 to apply opposing axial forces to the ends of member 79. The ends of member 79 are thus forced inwardly against wall 45 to form the circumferential crimps designated by numerals 83. Member 42 may be formed of soft brass with a wall thickness of about .03 inch, which is thin enough to permit the crimps to be formed when opposing torques are applied to members 75 and 78. The crimping is sufficient to effect a watertight seal between the ends of member 79 and the abutting portions of members 75 and 78.

Fitting 78 may be connected to supply plumbing of any conventional construction. For example, the supply plumbing can be thin walled copper tubing as shown at 85 or a conventional internally threaded nipple (not shown). The essence of the present invention is in the nature of the thin-walled member 42 which permits connection of the valve to various different supply conduit constructions commonly encountered at different job sites.

As the first step in the connection procedure, member 42 may be connected to bracket 34 in valve body 12, as for example during valve manufacture. Bracket 34 (with the valve mounted thereon) may be subsequently installed on the dishwasher frame at the factory. At the installation of the dishwasher onto the plumbing supply where the dishwasher will be used, the plumber will use a fitting 73 which comprises members 75, 79, and 78. The right end of fitting 78 can be connected to any fitting which lends itself to the existing plumbing system; this could be a pipe fitting, a pipe compression, flare, or sweated fitting to copper tubing. Fitting 73 is preferably installed on member 42 by holding member 78 motionless and applying a turning torque to member 75. A torque applied to member 78 will however not destroy the tube since the forces applied to the tube are predominantly radially inwardly, not circumferential.

A feature of the illustrated design is the elimination of assembly torque being transferred by the coupling member 42 to the valve body or mounting bracket 34, assembly torque being defined as the torque exerted by the plumber when connecting the fitting 73 to the coupling 42. In previous designs, the torque on the fitting transmitted through the coupling was of sufficient magnitude to damage the nylon body 12 if allowed to go unchecked. To prevent this damage various methods of preventing transmission of assembly torque to the valve body have been used. Those designs prevent the coupling from damaging the nylon body by preventing the coupling from rotation, usually transmitting the torque to the bracket which is designed to withstand these forces. The present design does not attempt to physically overcome or resist the torque; instead it functions so that no significant torque is transmitted through coupling 42. The plumber tightens nut 82 on member 78 with no significant forces being transmitted by the coupling to the valve body or bracket. The bracket 34-coupling 42 assembly is further advantageous because of its low cost compared to the cost of the press fit bracket-coupling assembly shown in the aforementioned patent application, Ser. No. 390,899.

In the fully installed position the assembly is fairly rigid and resistant to vibration or water hammer forces. Thus, the plastic valve has a fairly short dimension from bracket wall 38 to armature plunger 24, such that any large diaphragm forces due to water hammer have minimum tendency to fracture the valve or loosen its mounting. The large diameter portion 43 of coupling member 42 strengthens the member and additionally forms an internal clearance space to accommodate flow around screen 72.

If desired, the mounting of FIG. 1 may further be rigidified by the very inexpensive modification of bracket 34 shown in FIG. 2. As there shown, the bracket is formed with an annular flange 87 which closely surrounds large diameter portion 43 of member 42. This arrangement causes the bracket flange surface area to resist the water force along with the resistance offered by screws 48.

FIG. 2 illustrates a second method of securing coupling member 42 to the tube fitting. As there shown, the fitting comprises a first tubular member 86 having a smooth surfaced portion engageable with an outer surface of coupling member portion 45, and an internally threaded portion of larger internal diameter than the smooth-surfaced portion. Cooperating with member 86 is a second externally threaded member 89 having a tapered end surface engageable with a flared end surface 88 of the coupling member. During assembly, the nut 86 is slipped over member 42, the flare 88 is then formed by conventional apparatus (not shown), and the nut is turned onto fitting 89 to effect a seal between flare 88 and member 89. As with the FIG. 1 arrangement, no significant force is transmitted to the valve body or mounting bracket. The supply tubing can be connected to the right end of the fitting with a second member which lends itself to the application.

Both the FIG. 1 and FIG. 2 embodiments are characterized by a thin-walled coupling member 42 which is formable as a relatively low cost stamping. Thus these embodiments enjoy cost advantages over other arrangements using couplings formed by machining operations, as for example the arrangement shown in aforementioned patent application, Ser. No. 390,899. Coupling member 42 is further advantageous in that it lends versatility to valve as regards permitting the valve to be readily installed onto supply lines of varying types.

The invention has been described by way of two specific embodiments. It will be understood however that the invention may be practiced in other forms as come within the spirit of the accompanying claim.

What is claimed:

In combination: a molded plastic valve body having a face provided with an inlet flow opening; a thin-walled tubular metal coupling member of uniform wall thickness from end to end, said member having an outwardly radiating flange engaged flatwise against said valve body face; an annular groove in said valve body face surrounding the flow opening; a deformable gasket positioned in said groove in sealing engagement with the groove surface and coupling member radial flange; a mounting bracket for the valve body comprising an apertured plate portion adapted to seat on a mounting surface, and a second plate portion having a hole therethrough; said metal coupling member having its flange sandwiched between the valve body face and the second plate portion, and having its tubular portion extending through the bracket hole; and securing devices operable to draw the valve body tightly against the aforementioned radial flange of the tubular metal coupling member; the tubular portion of the coupling member including a first relatively large diameter portion extending from the radial flange through the bracket hole, and a second relatively small diameter portion extending upstream of the first portion; said coupling member having a wall of sufficient thinness to permit its upstream end portion to be deformed incident to its being clamped in a tube fitting; the first relatively large diameter portion of the coupling member forming an internal pocket, the inlet flow opening in the face of the valve body having approximately the same diameter as said pocket whereby to form a continuation thereof; and a hat-shaped strainer screen having its rim portion mounted within the flow opening, said screen having a sufficient axial length so that it extends into the coupling member pocket; the amount of strainer screen within the pocket being approximately the same as the amount thereof within the flow opening.

References Cited
UNITED STATES PATENTS

| | | | |
|---|---|---|---|
| 2,406,478 | 8/1946 | Snyder | 285—334.5 X |
| 2,225,693 | 12/1940 | Frances. | |
| 3,095,219 | 6/1963 | Tutty | 285—158 X |
| 3,104,400 | 9/1963 | Lantz et al. | 4—287 |
| 3,195,561 | 7/1965 | Sovitzky | 251—148 X |
| 2,281,199 | 4/1942 | McGarry et al. | 4—148 |

HENRY T. KLINKSIEK, *Primary Examiner.*